United States Patent
Tietjen et al.

(10) Patent No.: US 8,185,234 B2
(45) Date of Patent: May 22, 2012

(54) DEVICE AND METHOD FOR CONTROLLING THE LOADING AND/OR UNLOADING PROCESS OF AN AIRPLANE

(75) Inventors: Ronald Tietjen, Bremen (DE); Torsten Eilts, Wildeshausen (DE); Ekkehard Zischow, Bremen (DE); Norbert Palubitzki, Ganderkesee (DE)

(73) Assignee: Rheinmetall Defence Electronics GmbH, Bremen (DE)

( * ) Notice: Subject to any disclaimer, the term of this patent is extended or adjusted under 35 U.S.C. 154(b) by 766 days.

(21) Appl. No.: 11/795,233

(22) PCT Filed: Jan. 11, 2006

(86) PCT No.: PCT/EP2006/000174
§ 371 (c)(1),
(2), (4) Date: May 9, 2008

(87) PCT Pub. No.: WO2006/074908
PCT Pub. Date: Jul. 20, 2008

(65) Prior Publication Data
US 2009/0105874 A1 Apr. 23, 2009

(30) Foreign Application Priority Data

Jan. 13, 2005 (DE) .......................... 10 2005 001 517

(51) Int. Cl.
*B64D 9/00* (2006.01)
*G07B 15/02* (2006.01)
*G06F 7/00* (2006.01)
*B66B 17/00* (2006.01)
*G06K 7/10* (2006.01)

(52) U.S. Cl. .................. 700/219; 235/384; 235/462.01; 235/462.45; 702/175; 414/564

(58) Field of Classification Search .................. None
See application file for complete search history.

(56) References Cited

U.S. PATENT DOCUMENTS

| | | | |
|---|---|---|---|
| 3,584,503 A * | 6/1971 | Senour | 73/65.06 |
| 4,446,524 A | 5/1984 | Wendt | |
| 6,293,375 B1 * | 9/2001 | Chen | 188/164 |
| 6,923,375 B2 * | 8/2005 | Stefani | 235/462.01 |
| 2004/0226996 A1 | 11/2004 | Stefani | |

FOREIGN PATENT DOCUMENTS

DE  103 38 704  3/2005
WO  WO-01/90707  11/2001

OTHER PUBLICATIONS

Response to Office Action dated Oct. 25, 2006.
International Search Report dated Mar. 29, 2006.
International Preliminary Examination Report dated Jun. 11, 2007.
Written Office Action from International Search Report dated Oct. 2005.

* cited by examiner

*Primary Examiner* — Gene Crawford
*Assistant Examiner* — Yolanda Cumbess
(74) *Attorney, Agent, or Firm* — Venable LLP; Jeffri A. Kaminski

(57) ABSTRACT

The invention relates to a device and a method for controlling the loading and/or unloading process of an aeroplane. According to the invention, a parcel introduced into the aeroplane is identified, a weight is associated with the parcel, the position of the parcel inside the airplane is monitored, and the total weight and/or center of gravity of the aeroplane is calculated from the aeroplane information provided and the weights and positions of the parcels.

15 Claims, 1 Drawing Sheet

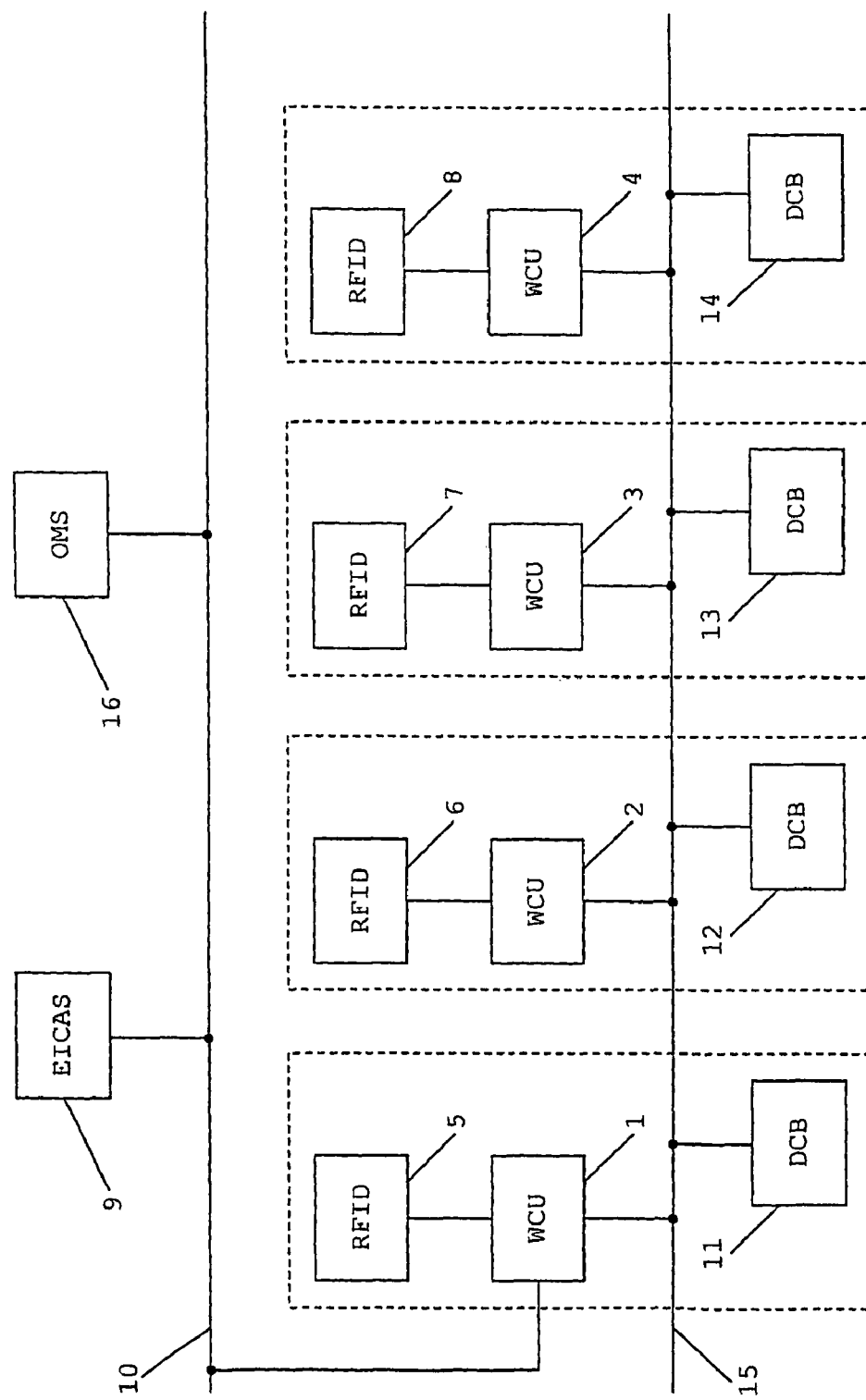

DEVICE AND METHOD FOR CONTROLLING THE LOADING AND/OR UNLOADING PROCESS OF AN AIRPLANE

TECHNICAL FIELD

The present invention relates to a method as well as a device for controlling the process of loading and/or unloading an airplane.

The weight and/or the center of gravity of an airplane changes in dependence on the loading situation. The total weight represents one of the critical parameters for calculating the required amount of fuel, whereas the center of gravity in particular influences the flight characteristics as well as the maneuverability and must therefore be within a defined range for the airplane. It is furthermore important to ensure that the center of gravity also remains within a specified range during the loading and unloading operation, for example to prevent the airplane tail from coming in contact with the ground (tail tip).

The weight and the center of gravity of a fully loaded airplane are determined ahead of time with the aid of a loading plan, which is used to assign positions within the cargo hold to the parcels. The term parcel in this case is understood to refer to the smallest differentiable units, also called ULD (unit load device), wherein these units can be pallets, containers, individual parcels, or other items.

STATE OF THE TECHNOLOGY

A control of the loading process is necessary because of the critical influence exerted by the weight and the center of gravity on the flight performance. The only control systems known for this so far are system using pressure sensors or strain gauges in the landing gear area. The measuring results permit drawing conclusions concerning the total weight of the airplane as well as the center of gravity.

Systems of this type have a number of disadvantages. Thus, they require a mechanical and electrical intervention into the landing gear, which is one of the essential component systems of an airplane. In addition, the relatively high empty weight of an airplane in relation to the individual parcels results in a limited accuracy, which is further reduced by the susceptibility to wind, rain, and snow loads. The influence of a parcel can furthermore be determined only after it is stored onboard, wherein it will become obvious only at that point whether parcels must be moved or even unloaded.

REPRESENTATION OF THE INVENTION

It is therefore the object of the present invention to provide an improved system for controlling the process of loading and/or unloading an airplane while avoiding the aforementioned disadvantages.

This object is solved according to the invention with a method as disclosed in patent claim 1 and a device as disclosed in patent claim 10. Further advantageous embodiments follow from the dependent claims. A generic device of this type is henceforth also referred to as a W&B (weight & balance) system.

A parcel that has already been loaded or will be loaded into the airplane is identified during the control of the loading and/or unloading process, a weight is assigned to this parcel, the position of the parcel is tracked inside the airplane, and the total weight and/or the center of gravity of the airplane is calculated from available airplane information, as well as the weights and positions of the parcels. The airplane information includes, for example, the weight and center of gravity of the empty airplane, data relating to the weight and the storage location of the fuel and other items and liquids, such as drinking water or catering carts.

A device according to the invention is provided with means for identifying a parcel that has already been loaded or must be loaded into the airplane, with at least one interface for connecting the device to at least one system for determining the parcel position, as well as at least one calculation unit for calculating the total weight and/or the center of gravity of the airplane from the available airplane information and the weights and positions of the parcels. The calculation unit is also referred to as WCU (weight calculation unit).

A cargo loading system is preferably used for determining and/or tracking the position of the parcel inside the airplane. A cargo loading system is a known system onboard an airplane, which can be used to move and secure the parcels. A system of this type comprises on the one hand actuators such as roller conveyors (PDU, power drive unit) for moving the parcels and, on the other hand, sensor such as overlap sensors for the PDUs or proximity switches for determining the position of the parcels. The sensor data are transmitted via the interface to the WCU, if necessary in the processed form. The W&B system can thus track the parcel position. The position can furthermore be determined with the aid of additional sensors or other devices, for example a device for detecting and processing an image. The W&B system is preferably connected via the CAN bus (controller area network) to the cargo loading system.

Alternative systems for determining or tracking the position of the parcel within the airplane include, for example, laser-based or infrared-based systems, ultrasonic systems, or optical systems operating on the basis of image detection.

Optionally, the future center of gravity of the airplane is projected using the airplane information, the weights and the positions of the parcels, and the status of the cargo loading system. The future position of the parcel can be extrapolated using the current position of the parcel and the conveying direction of the PDUs, thereby making it possible to detect critical loading conditions before these occur.

The airplane information and/or the weights of the parcels, for example, are recorded manually, are fed back via a cable or a data carrier, or are received via infrared or radio signal. However, the device preferably comprises an interface to an airplane data bus, for example an AFDX bus (avionics full duplex network) which provides the information to the WCU, for example via the EICAS (engine indicating and crew alerting system). Also possible is a continuous updating, which makes sense among other things during the fueling operation.

The parcels are identified, for example, with the aid of a keyboard, a touch screen, a barcode reader, and/or a receiver for infrared or radio signals such as a RFID receiver (radio frequency identification). According to one embodiment of the invention, a parcel is identified just prior to being loaded into the cargo hold, for example while positioned on a lifting platform or a conveying device such as conveyor belt and directly in front of the cargo hold door. In this way, the weight and/or the center of gravity of the airplane can be projected even before the parcel is loaded into the hold. The loading personnel can be warned or the cargo loading system can be shut down before the parcel is loaded into the airplane and causes an undesirable loading condition.

The identification can furthermore be used to check the loading sequence specified in the loading plan, thereby ensuring that the parcels are loaded in the correct sequence and do not block the final position or the transport path of a subsequently loaded parcel, which could necessitate the partial unloading of the cargo hold. The information that a parcel has been identified and loaded into the airplane can optionally be transmitted to the logistics system to allow a tracking of parcels along the logistics chain.

The weights of the parcels are determined, for example with the aid of scales forming part of the airport loading system or during the course of the logistics chain, and the values are then input into the W&B system with the aid of a keyboard, a touch screen, a barcode reader, and/or a receiver for infrared or radio signals, such as a RFID receiver. Alternatively, the respective weight is listed on the individual parcel and is scanned in during the identification. Alternatively, the weight can also be determined and/or verified with a scale arranged inside the airplane, for example a scale in the area of the ball mats near the door to the cargo hold.

The W&B system advantageously comprises at least one display device for displaying the weight and/or the center of gravity of the airplane. This display device can be a separate device, which operates jointly with an input means such as a keyboard, a barcode reader, or a receiver, or it can be integrated into an operating and control panel. Existing devices such as the EICAS and other operating and control panels can furthermore also be used for the display. The weight of a single parcel, of all parcels in one cargo hold and/or of all parcels in all cargo holds can alternatively or additionally also be displayed.

In critical situations it is furthermore advisable to trigger a visual and/or acoustic alarm or warning signal, for example if there is danger of a tail tip situation where the tail of the airplane comes in contact with the ground during the loading or unloading operation. The alarm could furthermore also be triggered if the center of gravity of the airplane has moved, or is in danger of moving, out of the permissible range, thereby resulting in a poorer flight position and the necessity for strong counter-steering during the flight.

According to a different advantageous embodiment, the W&B system is connected to an internal maintenance system (OMS: onboard maintenance system). In case of a malfunction, a simple diagnosis is thus possible by using a known and trusted maintenance system.

In addition to determining the weight and/or center of gravity of the airplane, the positions of the parcels can optionally be compared to those specified in the loading plan. In this way, it is possible to verify that the loading plan was followed or to detect a missing parcel. A parcel that is not listed in the loading plan can be detected during the identification process already, meaning when the parcel is loaded into the cargo hold. Optionally, it is also possible to store values for past, current, and projected loading conditions for information purposes.

The above-described W&B system can be used to monitor or control the loading of one as well as several cargo holds of an airplane. For the control of several cargo holds, a means for identifying a loaded parcel is preferably arranged near each cargo hold door. A single calculation unit is used, for example, for calculating the weight and/or center of gravity.

In addition to this centrally organized structure of the W&B system, for which a single WCU monitors all cargo holds, it is also possible to subdivide the system into subsystems arranged in the individual cargo holds, which are connected to each other via a bus system, wherein the use of a CAN bus also offers itself. The WCUs in that case are advantageously tied into a mater-slave arrangement, in which only the master is provided with an interface for connecting to the AFDX bus of the airplane. As a result, only one device must be connected to the data bus for the airplane.

Each WCU preferably determines the weight and weight distribution of the parcels located inside the associated cargo hold or the associated cargo holds and transmits these data to the master WCU, which then uses the data to calculate the total weight and/or the center of gravity of the airplane. Alternatively, each WCU receives the data from all cargo holds and calculates the total weight and/or the center of gravity of the airplane, which results in a redundancy in the calculation.

SHORT DESCRIPTION OF THE DRAWING

The invention is explained in further detail with the aid of an exemplary embodiment, wherein FIG. 1 shows a subdivided W&B system comprising several WCUs.

WAYS OF EMBODYING THE INVENTION

This exemplary embodiment shows the use of a W&B system according to the invention for an Airbus A380-800. Airplanes of this type are equipped with an AFDX data bus 10 and comprise a total of four cargo holds (main deck, upper deck, front lower deck and rear lower deck). For the purpose of this exemplary embodiment, a distributed system is used, for which each cargo hold is equipped with a WCU 1-4. The WCUs are connected to each other or via a CAN bus 15, in a master-slave arrangement, wherein the master WCU 1 is additionally connected via an interface to an AFDX bus 10. The EICAS 9, which is also connected to this bus, provides the WCUs 1-4 with basic information, such as the weight and the center of gravity of the empty airplane, the weight and the location of the fuel supply, as well as of other objects. In addition, a connection is established via the AFDX bus 10 between the W&B system and the onboard maintenance system (OMS) 16 arranged inside the airplane, which makes possible a simple maintenance of the system.

The WCUs 1-4 are furthermore connected via the CAN bus 15 to the door control boxes (DCB) 11-14 and thus the cargo loading system for the individual cargo holds. The DCBs function to control the roller conveyors inside the cargo hold, for example with the aid of a joystick. The WCUs 1-4 are furthermore connected to RFID readers 5-8, wherein these readers 5-8 are used to identify the parcels that are loaded into the cargo holds. The weight of each individual parcel is stored in the WCUs 1-4. The individual components assigned to a cargo hold are shown framed with a dashed rectangle.

The WCU 1 receives the basic data for the empty airplane from the EICAS 9 by way of the AFDX bus 10. If a new parcel is loaded into the airplane, the identification of the parcel is read out via the RFID and a weight is assigned to the parcel in the WCU that is assigned to this cargo hold. Using this weight and the information relating to previously loaded parcels, the WCUs 1-4 then calculate the weight and the weight distribution for the parcels inside the respective cargo holds and subsequently transmit these data to the WCU 1, which then calculates the total weight and/or the center of gravity of the airplane and load. These values can be transmitted via the AFDX bus 10 to the EICAS 9 and can be displayed in the cockpit, or they can also be transmitted via the CAN bus 15 to the DCBs 11-14 to be displayed in the individual cargo holds.

With the aid of the cargo loading system, the parcel is moved within the cargo hold to its final position. In the process, sensors belonging to the cargo loading system continuously detect the current position and transmit this position via the CAN bus 15 to the responsible WCU, which then uses the data to continuously calculate the momentary center of gravity position for the parcels inside the cargo hold and to transmit this position to the master WCU 1. The master WCU continuously calculates the weight and/or the center of gravity of the airplane and compares these values to the specified limit values. If these specified values are exceeded, the roller conveyors for the cargo loading systems are stopped and/or a corresponding alarm is triggered. By detecting the final positions for the parcels, it is possible to monitor the adherence to the loading plan and, if necessary, initiate a reloading of the parcels.

The above-described example must be understood as exemplary embodiment and should not be viewed as limiting. In particular, the type and number of components as well as their arrangement can be varied without deviating from the inventive idea. The use is furthermore not limited to airplanes, but can also be applied to other means of transportation, such as helicopters and ships, wherein the distribution of the calculations can also be different for the WCUs.

According to one modification of the invention, the W&B system is supplied with the centers of gravity for the individual parcels in addition to their weight, thereby making possible an even more accurate calculation of the center of gravity of the airplane.

LIST OF REFERENCE NUMBERS

1 WCU
2 WCU
3 WCU
4 WCU
5 RFID receiver
6 RFID receiver
7 RFID receiver
8 RFID receiver
9 EICAS
10 AFDX bus
11 DCB
12 DCB
13 DCB
14 DCB
15 CAN bus
16 OMS

The invention claimed is:

1. A method for controlling the process of loading and/or unloading an airplane comprising:
loading or unloading parcels into a cargo hold of the airplane with actuators of a cargo loading system moving the parcels;
identifying the parcel that has been loaded or will be loaded into the airplane; associating a weight with the parcel;
tracking continuously during loading and/or unloading the position of the parcel within the cargo hold of the airplane with the aid of sensors that are part of the cargo loading system; and
calculating a total weight and/or a center of gravity of the airplane continuously during loading and/or unloading based on airplane information, and the weights and positions of the parcels.

2. The method according to claim 1, wherein the parcels are identified with the aid of a keyboard, a touch screen, a barcode reader and/or a receiver for infrared or radio signals.

3. The method according to claim 1, wherein the parcels are identified immediately prior to being loaded into the cargo hold.

4. The method according to claim 1, wherein the future center of gravity for the airplane is prognosticated by using the airplane information, the weights and positions of the parcels, and the status of the cargo loading system.

5. The method according to claim 1, further comprising issuing a warning if a limit value for the weight and/or the center of gravity for the airplane is exceeded.

6. The method according to claim 1, further comprising verifying the weight of the parcel inside the airplane.

7. The method according to claim 1, further comprising comparing the positions of the parcels to a loading plan.

8. The method according to claim 1, wherein the weight and/or the center of gravity of the airplane are displayed.

9. A device for controlling the process of loading and/or unloading an airplane, said device comprising:
a cargo loading system for loading parcels into a airplane, the cargo loading system including actuators for moving the parcels and sensors for determining a position of the parcels;
means for identifying the parcel that has been loaded or will be loaded into a cargo hold of the airplane;
at least one interface for connecting to the cargo loading system for continuous determination with the aid of the sensors of the position of the parcel within the cargo hold during loading and/or unloading; and
at least one calculation unit for continuous calculation during loading and/or unloading of a total weight and/or a center of gravity of the airplane based on airplane information and the weights and positions of the parcels.

10. The device according to claim 9, further comprising an interface for connecting the device to an airplane data bus.

11. The device according to claim 9, wherein the means for identifying the parcel is a keyboard, a touch screen, a barcode reader and/or a receiver for infrared or radio signals.

12. The device according to claim 9, further comprising an interface for the connection to an onboard maintenance system.

13. The device according to claim 9, wherein a subdivision of the device into subsystems, which are arranged in the individual cargo areas and are connected to each other with a bus system.

14. The device according to claim 9, further comprising at least one display device for displaying the weight and/or center of gravity for the airplane.

15. The device according to claim 9, wherein a scale arranged in the airplane for controlling the weight of the parcel.

* * * * *